(12) United States Patent
Bruno et al.

(10) Patent No.: US 12,043,074 B2
(45) Date of Patent: Jul. 23, 2024

(54) COMPENSATION OF THE THERMAL EFFECT IN A VEHICLE SUSPENSION SYSTEM

(71) Applicant: MARELLI SUSPENSION SYSTEMS ITALY S.P.A., Corbetta (IT)

(72) Inventors: Walter Bruno, Asti (IT); Piero Antonio Conti, Asti (IT); Fabio Cotto, Turin (IT); Marco Di Vittorio, Turin (IT); Giordano Greco, Turin (IT); Simone Marchetti, Turin (IT)

(73) Assignee: MARELLI SUSPENSION SYSTEMS ITALY S.p.A., Corbetta (IT)

( * ) Notice: Subject to any disclaimer, the term of this patent is extended or adjusted under 35 U.S.C. 154(b) by 505 days.

(21) Appl. No.: 17/415,375

(22) PCT Filed: Dec. 20, 2019

(86) PCT No.: PCT/IB2019/061185
§ 371 (c)(1),
(2) Date: Jun. 17, 2021

(87) PCT Pub. No.: WO2020/136527
PCT Pub. Date: Jul. 2, 2020

(65) Prior Publication Data
US 2022/0055435 A1 Feb. 24, 2022

(30) Foreign Application Priority Data
Dec. 24, 2018 (IT) .................. 102018000020989

(51) Int. Cl.
*B60G 17/016* (2006.01)
*B60G 17/08* (2006.01)
(52) U.S. Cl.
CPC ........... *B60G 17/016* (2013.01); *B60G 17/08* (2013.01); *B60G 2400/102* (2013.01);
(Continued)

(58) Field of Classification Search
CPC .................. B60G 17/016; B60G 17/08; B60G 2400/102; B60G 2400/7162;
(Continued)

(56) References Cited

U.S. PATENT DOCUMENTS

| | | | |
|---|---|---|---|
| 5,119,297 A | * | 6/1992 | Buma .................. B60G 17/016 280/5.507 |
| 5,200,895 A | * | 4/1993 | Emura ................. B60G 17/015 701/37 |

(Continued)

FOREIGN PATENT DOCUMENTS

| | | | |
|---|---|---|---|
| DE | 4003959 A1 | 8/1991 | |
| DE | 10237012 A1 | 3/2004 | |
| DE | 102015120989 A1 | * 6/2016 | ........... B60G 17/019 |

OTHER PUBLICATIONS

International Search Report and Written Opinion of the International Searching Authority for PCT International Patent Application No. PCT/IB2019/061185 mailed May 15, 2020.

*Primary Examiner* — Frank B Vanaman
(74) *Attorney, Agent, or Firm* — Howard & Howard Attorneys PLLC

(57) ABSTRACT

A method for controlling the damping characteristic of a shock absorber of a vehicle, particularly for compensating the variation of the operating temperature of the shock absorber, in an active or semi-active suspension system. The compensation of the variation of the operating temperature of the shock absorber takes place by: estimating a mechanical power dissipated in heat by the shock absorber; estimating a thermal power exchanged by the shock absorber with the environment; evaluating the current operating temperature of the shock absorber as a function of the dissipated mechanical power and of the thermal power exchanged with the environment; and controlling the driving current of the control valve of the shock absorber according to a shock (Continued)

absorber reference model indicating a relationship between the damping force of the shock absorber, the operating temperature of the shock absorber and the driving current of the control valve.

14 Claims, 4 Drawing Sheets

(52) U.S. Cl.
CPC ........... *B60G 2400/7162* (2013.01); *B60G 2500/10* (2013.01); *B60G 2600/184* (2013.01); *B60G 2600/1873* (2013.01)

(58) Field of Classification Search
CPC .......... B60G 2500/10; B60G 2600/184; B60G 2600/1873
See application file for complete search history.

(56) References Cited

U.S. PATENT DOCUMENTS

| | | | | |
|---|---|---|---|---|
| 5,579,229 | A | * | 11/1996 | Maguran, Jr. ............. F16F 9/52 280/5.515 |
| 5,968,102 | A | * | 10/1999 | Ichimaru ................... F16F 9/46 701/37 |
| 2003/0070892 | A1 | | 4/2003 | Iyengar et al. |
| 2003/0195683 | A1 | | 10/2003 | Oakley et al. |
| 2011/0035091 | A1 | * | 2/2011 | Yamamoto .............. B60T 8/171 701/31.4 |
| 2013/0197754 | A1 | * | 8/2013 | Lee .................... B60G 17/0157 701/37 |
| 2017/0166027 | A1 | | 6/2017 | Rutkowski et al. |
| 2018/0319241 | A1 | | 11/2018 | Hirao et al. |
| 2018/0339566 | A1 | * | 11/2018 | Ericksen ................ B60G 17/08 |
| 2022/0009303 | A1 | * | 1/2022 | Beddis ............... B60G 17/0165 |

\* cited by examiner

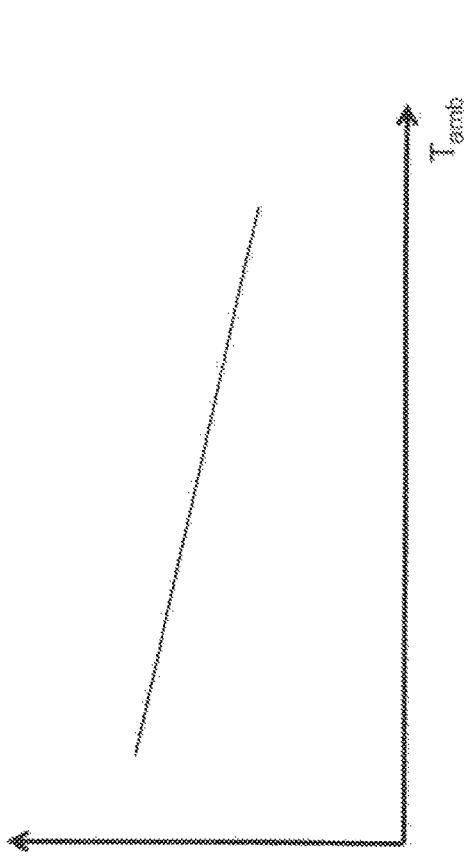
FIG. 4A
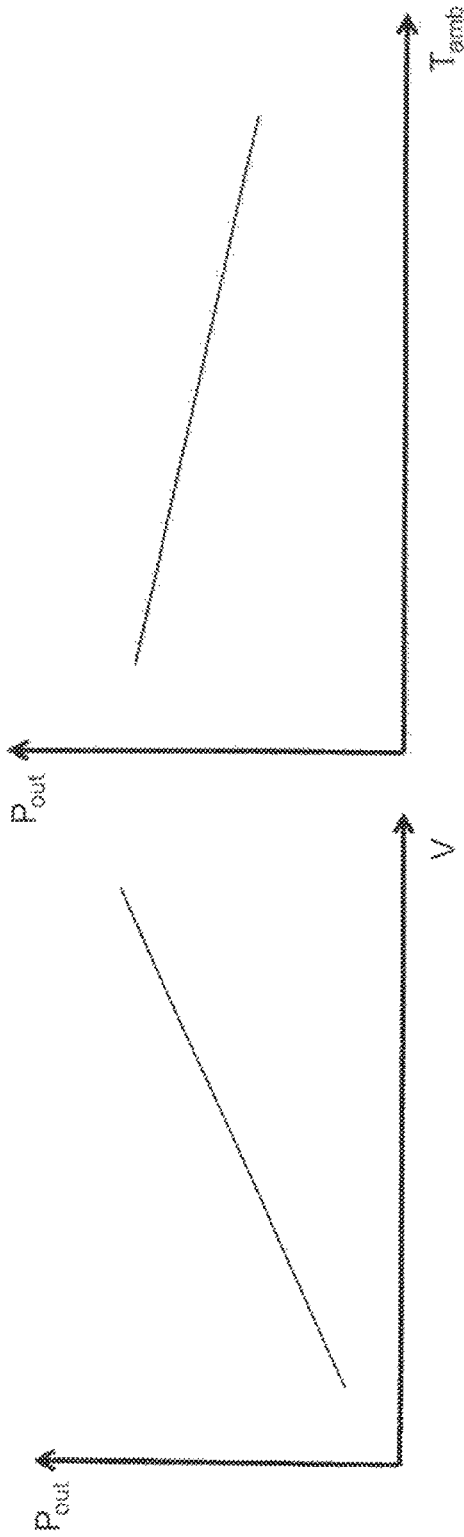
FIG. 4B
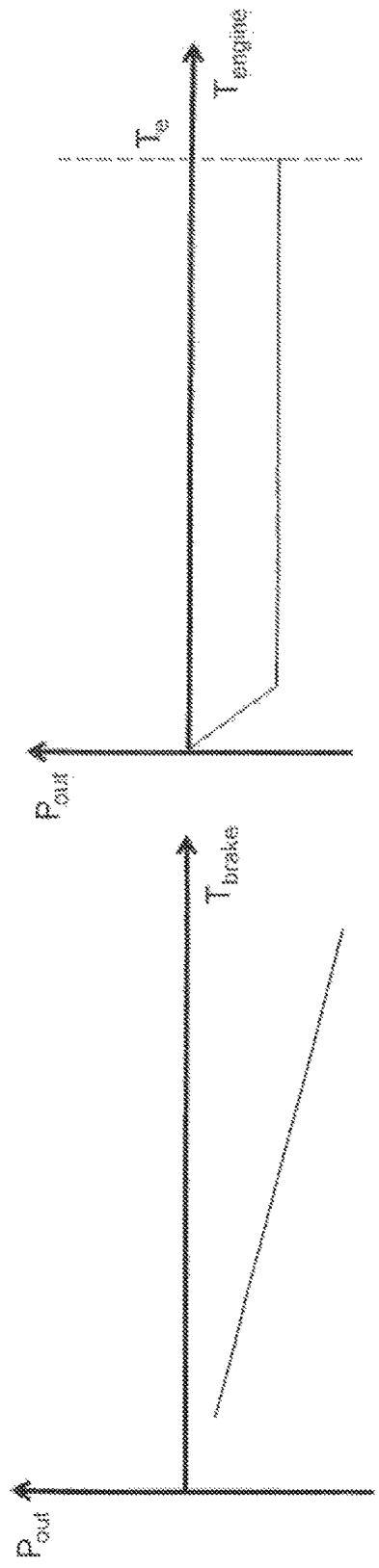
FIG. 4C
FIG. 4D

COMPENSATION OF THE THERMAL EFFECT IN A VEHICLE SUSPENSION SYSTEM

CROSS-REFERENCE TO RELATED APPLICATIONS

The present application is a National Stage of International Patent Application No. PCT/IB2019/061185, filed on Dec. 20, 2019, which claims priority to and all the benefits of Italian Patent Application No. 102018000020989, filed on Dec. 24, 2018, both of which are hereby expressly incorporated herein by reference in their entirety.

BACKGROUND OF THE INVENTION

1. Field of the Invention

The present invention relates in general to the active or semi-active suspension systems of a vehicle, and more particularly to the estimation and compensation of the thermal effect in an active or semi-active suspension system. More specifically, the invention relates to controlling the damping characteristic of a shock absorber of a vehicle, particularly for compensating the variation of the operating temperature of the shock absorber.

2. Description of the Related Art

Nowadays more and more often, especially in the automotive field, adjustable damping shock absorbers are used which are able to vary their damping characteristics under the control of an electronic control unit to modify the behavior of the vehicle suspension system as a function, for example, of the road surface conditions, the vehicle driving conditions, comfort settings desired by the driver, wear status of one or more shock absorbers.

The vertical movements of the body of a vehicle, and more generally the vertical dynamics of the vehicle, are influenced by the conditions of the road surface and by the maneuvers imparted by the driver, such as steering, acceleration, braking, changing gear ratios, but also by the degradation conditions of the shock absorbers.

A semi-active suspension system generally includes: adjustable damping shock absorbers, of the type including a pressure chamber containing a damping fluid (oil), inside which a piston is slidable, the position of which defines a lower pressure chamber and an upper pressure chamber, a by-pass chamber in communication with the upper pressure chamber through fluid passage holes, and a control valve, typically a solenoid valve, arranged to control the passage of the damping fluid between the pressure chamber and the by-pass chamber; a set of sensors adapted to detect relative acceleration or more generally the relative movement between the vehicle body and the wheel hubs and the accelerations and movements of the body, arranged at the front and rear axles of the vehicle; and an electronic processing and control unit, adapted to receive and interpret the signals emitted by the sensors, indicative of the dynamics of the vehicle, and arranged to emit driving signals of the control valves of the shock absorbers of the system to track the desired damping characteristics of the shock absorbers in order to comply with predetermined safety conditions or driving settings.

The control logic of the suspension system is of the modular type, so that it is controlled according to one of a plurality of predefined control strategies according to the detected conditions of the road surface, the lateral and longitudinal dynamics of the vehicle, the damping characteristic model set and/or desired by the user, according to predetermined priority rules in view of keeping the vehicle running in a safe condition.

The damping characteristics of the shock absorbers are adjusted by the control unit by emitting an electric current driving signal of the actuator of the shock absorber control solenoid valve, the intensity whereof is typically adjusted according to the known pulse width modulation (PWM) technique. Such an adjustment of the valve driving current allows the damping force characteristic to be adjusted continuously as a function of the relative translation speed between the wheel unit and the vehicle body (F/v), for each individual shock absorber. Compared to passive suspension systems, in which the damping characteristic (F/v) is determined by the mechanical and physical parameters of the shock absorber and by the viscosity characteristics of the damping fluid and is represented by a single determined curve on which the working point of the shock absorber is placed, a semi-active suspension system defines a cloud of working points belonging to different damping curves (F/v) that cover a working area between a minimum damping characteristic (which corresponds to a perceivable under-damped behavior of the suspension's own oscillation modes) and a maximum damping characteristic (which corresponds to a perceivable over-damped behavior of the suspension's own oscillation modes), within which an intermediate safety damping curve is set, depending on the mechanical and physical parameters of the shock absorber and the viscosity characteristics of the damping fluid and on which the system automatically sets in the event of a malfunction of the control solenoid valve, the so-called fail-safe curve.

In a vehicle running condition, depending on its current operating conditions, a shock absorber is subject to variations in the operating temperature which influence the viscosity of the damping fluid and, ultimately, determine changes in the damping behavior of the shock absorber with respect to a nominal design/calibration characteristic damping curve (F/v), or better in the relationship between damping characteristic (F/v) and driving current of the control solenoid valve. This basically means that with the same roughness of the road surface, the average real value of the driving current of the solenoid valve is different with respect to the nominal conditions.

It is therefore desirable to monitor any deviations from the nominal design/calibration performance due to thermal effects.

SUMMARY OF THE INVENTION

The object of the present invention is to provide a method for controlling the damping characteristic of the shock absorbers of a vehicle for compensating the thermal effect to which they are subjected in the operating conditions. A further object of the invention is to provide a method for estimating the changes in the performance of a shock absorber and compensating for the variation of the operating temperature of the shock absorber in an active or semi-active suspension system, to adapt in real time the control strategies of the system to the current operational characteristic of the shock absorbers.

According to the present invention, these objects are achieved by a system and a method for controlling the damping characteristic of a shock absorber of a vehicle, having the features referred to in the independent claims.

Particular embodiments are expressed in the dependent claims.

A further subject of the invention is a computer program and a suspension system as claimed.

In summary, the present invention is based on the principle of estimating—during the running of the vehicle—the mechanical power dissipated in heat by each shock absorber and the thermal power exchanged by the shock absorber with the environment, and of using these estimates to evaluate the current operating temperature of the shock absorber.

The mechanical power ($P_m=F*v$) generated as a result of road unevenness and dissipated by each shock absorber is estimated as a function of the relative vertical translation speed between the wheel with which the shock absorber is associated and the vehicle body and the driving current of the control valve. Specifically, the mechanical power dissipated in heat is evaluated starting from the hydraulic characteristics of the shock absorber. In particular, at each instant it is possible to assess its relative speed due to the relative vertical translation between the wheel to which the shock absorber is associated and the vehicle body, and being present a continuous control on the shock absorber control valve (for example, a Skyhook type control), the instantaneous driving current is also known. Starting from these two quantities, using maps representative of the behavior of the shock absorber, it is possible to obtain the instantaneous damping force and, consequently, the dissipated mechanical power.

The thermal power exchanged by the shock absorber with the environment is preferably estimated on the basis of signals present on the vehicle CAN network, or by providing ad hoc sensors, due to the effect of at least one of the following parameters: the ambient temperature, the vehicle speed, the use of the vehicle's braking system in the proximity of the shock absorber and the operating temperature of the vehicle's engine in the proximity of the shock absorber. Specifically, the thermal power exchanged with the environment is estimated first starting from the temperature of the latter and—in enhanced embodiments—from other quantities among which the most relevant is the vehicle speed, since the flow of air that touches the external shell of the shock absorber is strongly influenced by it. Advantageously, further parameters can be used so as to take into account the effects of heat exchange between the engine and the shock absorber or between brake discs and shock absorber, although these latter effects have less influence and are used for greater accuracy of the estimate.

The current operating temperature of the shock absorber is estimated in a condition of thermal equilibrium as a function of the mechanical power dissipated in heat by the shock absorber and of the thermal power exchanged by the shock absorber with the environment, according to the general expression:

$$T_{amm}=f(C,P_{in},P_{out},t)$$

where $T_{amb}$ represents the ambient temperature, C the thermal capacity, $P_{in}$ the mechanical power input to the shock absorber, $P_{out}$ the thermal power dissipated and t the time.

Subsequently, the temperature value obtained can be used to compensate for the deviation of the damping characteristic of the shock absorber with respect to the nominal temperature characteristic. A temperature compensation strategy is applied by controlling the driving signal of the shock absorber control valve based on a reference model representing the shock absorber damping force change following the temperature deviation from the nominal operating value, for set driving current levels. The variation of the damping force caused by the variation of the viscosity of the damping fluid due to the thermal effect, is therefore converted into an offset of the driving signal of the shock absorber control valve—in one embodiment, of the driving current of the shock absorber control valve—in order to restore the correct damping force value.

The relative vertical translation speed between the wheel to which the shock absorber is associated and the vehicle body is for example determined starting from a quantity corresponding to signals indicating a movement or stroke of the shock absorber, so that the relative vertical translation speed between the wheel and the vehicle body is determined by derivative of said displacement signals, or starting from a quantity corresponding to signals indicative of a relative vertical acceleration between said wheel and the vehicle body, whereby the relative vertical translation speed between the wheel and the vehicle body is determined by integration of said acceleration signals. In the latter case, the acceleration signals can be acquired by sensors including at least three accelerometers coupled to the vehicle body and at least one accelerometer coupled to each hub of the vehicle wheels.

BRIEF DESCRIPTION OF THE DRAWINGS

Further features and advantages of the invention will appear more clearly from the following detailed description of an embodiment thereof, given by way of non-limiting example with reference to the accompanying drawing, in which:

FIGS. 4A-4D are exemplary diagrams of the pattern of the mechanical power dissipated in a shock absorber according to different thermal exchange parameters.

DETAILED DESCRIPTION OF THE INVENTION

Figure 1:
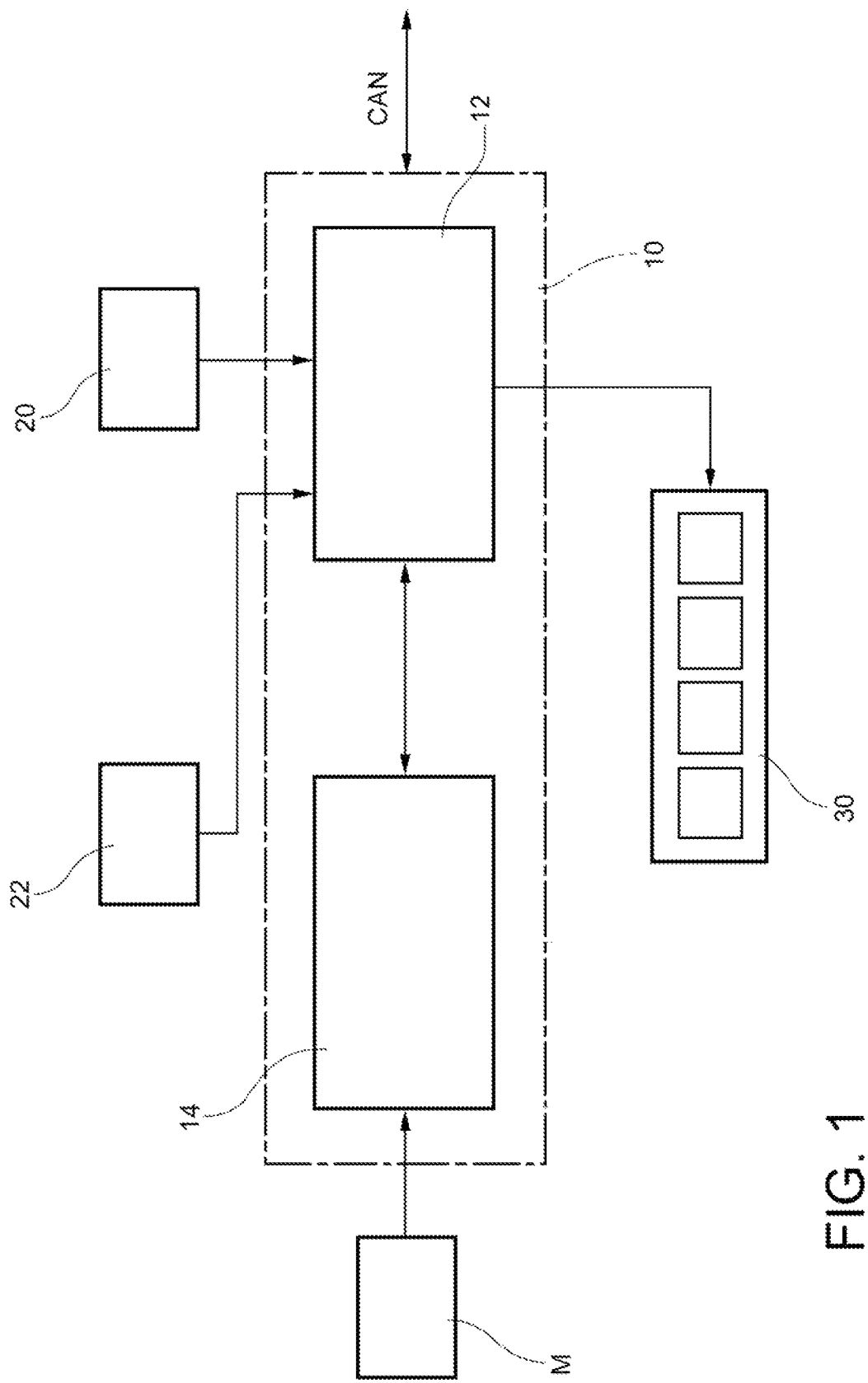
FIG. 1 is a schematic representation of the control architecture of an active or semi-active suspension system, arranged for compensation of the variation of the operating temperature of the shock absorber.

With reference to the block diagram of FIG. 1, the control architecture of an active or semi-active suspension system according to the invention is schematically shown.

A control unit 10 of the system comprises a processing module 12 of a control strategy, arranged to select one of a plurality of predefined control strategies according to the detected conditions of the road surface, the lateral and longitudinal dynamics of the vehicle, the damping characteristic model set and/or desired by the user, according to predetermined priority rules in view of keeping the vehicle running in a safe condition.

The control module 12 is coupled to sensor assemblies 20, 22 (generally including accelerometers), respectively coupled to the vehicle body and to the wheel hubs, adapted to detect the relative acceleration (i.e., relative vertical acceleration) or the relative movement (i.e. relative vertical movement) between the vehicle body and the wheel hub. In one embodiment, the sensor assembly 20 comprises three sensors coupled to the vehicle body in order to be able to evaluate the body motions, for example two sensors positioned on the front axle at the suspension domes, and one positioned on the rear axle, and the sensor assembly 22 comprises at least one pair of sensors arranged on the front wheel hubs and preferably a number of sensors corresponding to the number of wheels of the vehicle, arranged on the hubs of the front and rear wheels.

It is also coupled to an on-board CAN bus on which other on-board control units are communicatively connected, typically a motor control unit, a transmission control unit, a longitudinal vehicle dynamic control unit arranged for management of the ABS, EBD, ASR functions during braking or acceleration maneuvers, a lateral vehicle dynamic control unit arranged for steering maneuvering management, and a control unit for the interior and bodywork devices, commonly referred to as "body computer".

In one embodiment, a user interface is also provided (not shown) for acquiring commands to set the desired behavior of the suspension system as a whole (comfort, sports) and/or the representation of operating status information of the system, for example by use of a warning light of a detected anomaly condition.

Finally, reference numeral 30 generally indicates the adjustment valves for the damping characteristics of the shock absorbers, individually controlled by the control module 12.

Reference numeral 14 indicates a processing module for estimating and compensating the variation of the operating temperature of the shock absorber, integrated in the control unit 10, and coupled to the control module 12, from which it receives in input signals or data indicative of the relative vertical translation speed between each wheel to which a respective shock absorber is associated and the vehicle body, generally indicated $V_{amm}$, and signals or data indicative of the driving signals of the shock absorber control valves, generally indicated $I_{amm}$, in particular of the values of a quantity representative of driving signals, preferably a driving current. The module 14 is further arranged to supply the control module 12 with a control signal of the driving signal of the shock absorber control valve, preferably an offset signal $\pm \Delta I_{amm}$ of the driving current.

Figure 2:
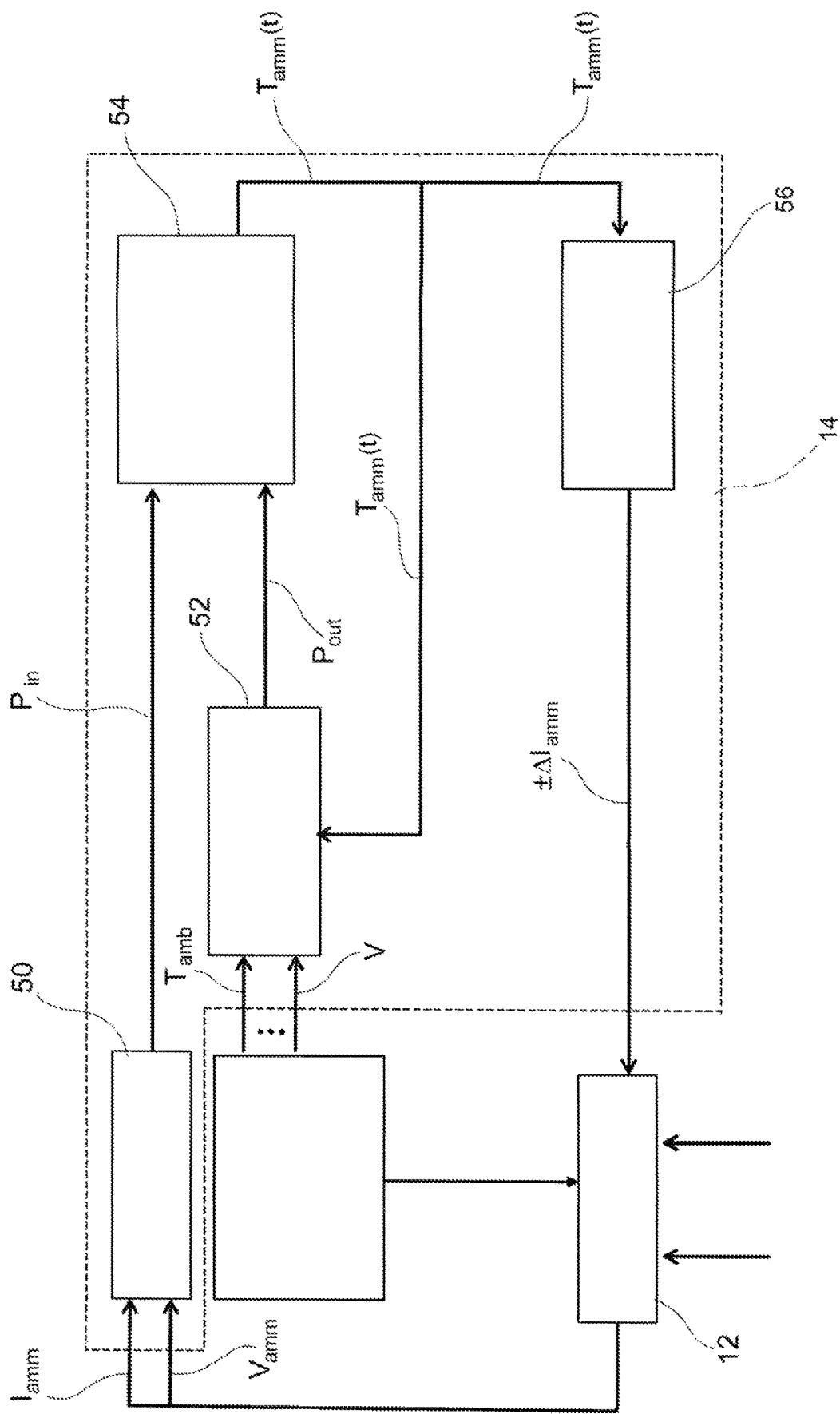
FIG. 2 is another representation of the block diagram of the control architecture of an active or semi-active suspension system of FIG. 1, including a detailed representation of a processing module for an estimation and compensation of the variation of the operating temperature of the shock absorber.

The processing module 14 will be described in greater detail in the remainder of the present discussion, with reference to the block diagram of FIG. 2.

The processing module 14 is furthermore coupled in reading and writing with a memory module M adapted to store a predetermined plurality of reference models of the shock absorbers (or of each individual shock absorber or pair of shock absorbers), for example a first reference response model which is indicative of a nominal relationship between the relative vertical translation speed of the shock absorber, the quantity representative of the driving signal of the control valve and the damping force of the shock absorber and a second reference model which is indicative of a relationship between the damping force of the shock absorber, the operating temperature of the shock absorber and the quantity representative of the driving signal of the control valve.

The first reference model can be an analytical relationship between, or a map of numerical values in a one-to-one correspondence of, relative vertical translation speed supported by the hub of the wheel with which the shock absorber is associated, which is representative of the driving signal of the control valve of the shock absorber and damping force of the shock absorber, generally represented as $F=F(I,V)$, at an operating temperature of the shock absorber preferably between $-40°$ C. and $120°$ C.

The second reference model can be an analytical relationship between, or a map of numerical values in a one-to-one correspondence of the shock absorber damping force, the operating temperature of the shock absorber and the quantity representative of the driving signal of the shock absorber control valve.

For example, each model can be generated starting from experimental measurements of the aforementioned parameters during bench tests of the shock absorber or in a calibration step at the time of vehicle tuning.

The first reference response model and the second reference model can be integrated into a single overall reference model indicative of a plurality of nominal relationships between the relative vertical translation speed of the shock absorber, the quantity representing the driving signal of the control valve of the shock absorber and the damping force of the shock absorber for different operating temperatures of the damping fluid.

With reference to the block diagram of FIG. 2, the processing module 14 for estimating and compensating the variation of the operating temperature of at least one shock absorber and preferably of all the shock absorbers of the vehicle is described below.

The processing module 14 includes a first estimator module 50 adapted to receive in input signals or data indicative of the driving signals of the shock absorber control valves, generally indicated $I_{amm}$, in particular of the values of a quantity representative of driving signals, preferably a driving current.

The processing module 14 also includes a second estimator module 52 adapted to receive in input signals or data from the CAN network of the vehicle or from ad hoc sensors, indicative of at least one of the following parameters: the ambient temperature, the vehicle speed, the use of the vehicle's braking system in the proximity of the shock absorber and the operating temperature of the vehicle's engine in the proximity of the shock absorber.

The first estimator module 50 arranged for estimating a mechanical power $P_{in}$ dissipated in heat by the shock absorber as a function of the relative vertical translation speed between the wheel with which the shock absorber is associated and the body of the vehicle and of the quantity representative of the driving signal of the control valve of the shock absorber in a current operating condition of the shock absorber, according to the first reference response model of the shock absorber stored in the memory M and indicating a nominal relation between the relative vertical translation speed of the shock absorber, the quantity representative of the driving signal of the control valve of the shock absorber and the damping force of the shock absorber, at a standard environmental temperature of $25°$ C.

Figure 3:
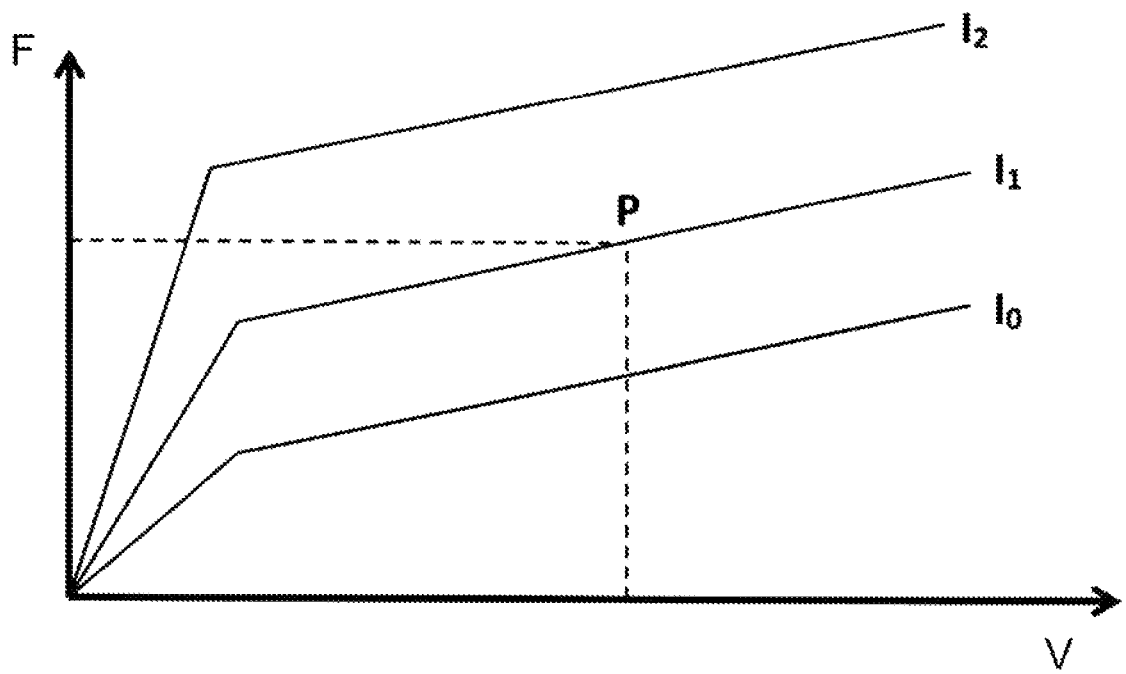
FIG. 3 is an exemplary diagram of the pattern of the damping force curves as a function of the relative vertical translation speed for a shock absorber, depending on the driving current of the control valve of the shock absorber.

A graphical representation of the relationship between the relative vertical translation speed of the shock absorber and the damping force of the shock absorber as a function of the intensity of the driving current of the control valve is shown in FIG. 3.

The second estimator module 52 is arranged to estimate a thermal power $P_{out}$ exchanged by the shock absorber with the environment according to at least one current operating condition of the vehicle, preferably as a priority starting from the temperature of the environment $T_{amb}$ and possibly—in improved embodiments—from other quantities including the vehicle speed v, the heat exchange between the engine and the shock absorber, i.e. as a function of the operating temperature of the engine $T_{engine}$ and the heat exchange between brake discs and shock absorber, i.e. depending on the use and consequent overheating of the braking system of the vehicle which causes a temperature $T_{brake}$ in the adjacent environment in which the shock absorber is located.

An illustrative graphic representation of the relation between the thermal power exchanged with the environment $P_{out}$ and respectively (a) the longitudinal traveling speed v of the vehicle, (b) the temperature of the environment $T_{ammb}$, (c) the temperature $T_{brake}$ of the vehicle brakes, (d) operating temperature $T_{engine}$ of the vehicle engine shown in the diagrams in FIGS. 4A-4D. These figures show how the thermal power exchanged with the environment $P_{out}$ increases, for example linearly, with the vehicle's longitudinal travel speed v, decreases, for example linearly, with increasing ambient temperature $T_{amb}$ and temperature $T_{brake}$ of the brakes of the vehicle, initially decreases and then remains constant with increasing of the operating temperature of the vehicle engine $T_{engine}$ (which does not exceed an operating temperature $T_e$).

An evaluator module 54 is coupled to the outputs of the estimator module 50 and of the estimator module 52 and arranged to evaluate the current operating temperature $T_{amm}(t)$ of the shock absorber as a function of the mechanical power dissipated in heat $P_{in}$ estimated by the first estimator module 50 and of the thermal power exchanged with the environment $P_{out}$ estimated by the second estimator module 52.

The evaluator module 54 evaluates the current operating temperature $T_{amm}(t)$ of the shock absorber according to a general relationship $$T_{amm}=f(C,P_{in},P_{out},t)$$

therefore as a function of the thermal capacity of the shock absorber (complete in its parts, the thermal capacity being estimated with experimental bench and vehicle measurements), of the mechanical power input to the shock absorber and of the thermal power dissipated, over time.

The evaluator module 54 emits a signal or data indicative of the current operating temperature $T_{amm}(t)$ of the shock absorber, which is supplied in feedback to the second estimator module 52 so that it is possible to estimate the thermal power dissipated as a function of the current temperature of the shock absorber, and is supplied in input to a controller module 56 in communication with the second reference model of the shock absorber stored in the memory M. The evaluator module 54 is arranged to control the driving signal of the shock absorber control valve, preferably for determining an offset signal $\pm \Delta I_{amm}$ of the intensity of the driving current according to a reference model of the shock absorber indicative of a relationship between the damping force of the shock absorber, the operating temperature of the shock absorber and the intensity of the driving current of the control valve.

Figure 5:
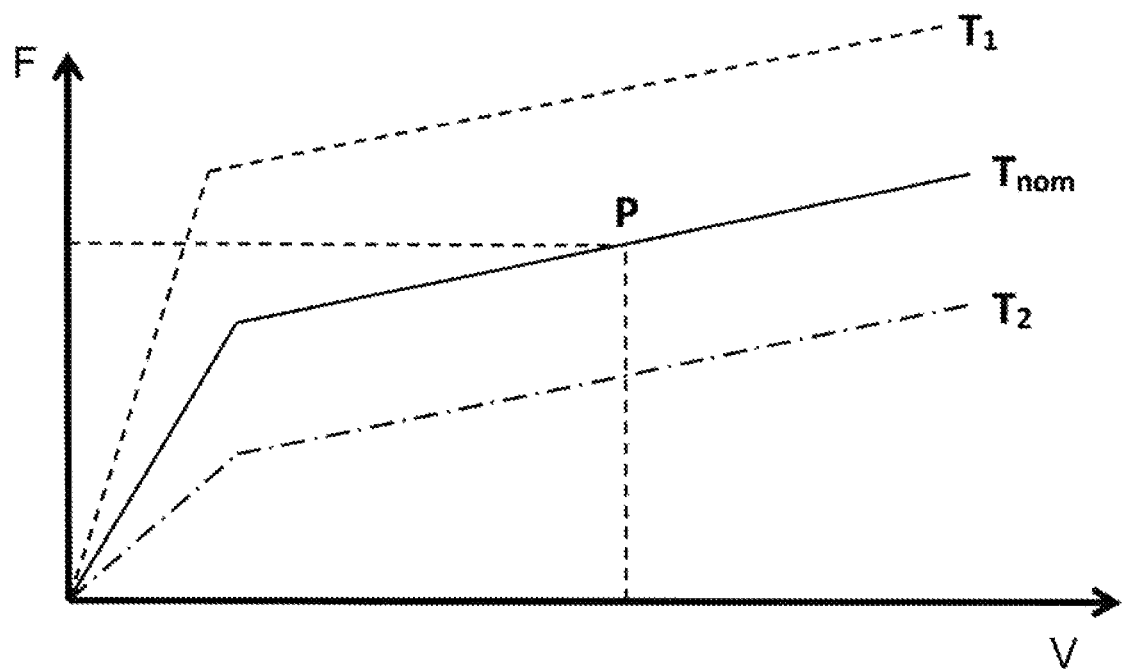
FIG. 5 is an exemplary diagram of the pattern of the damping force curves as a function of the relative vertical translation speed for a shock absorber, depending on the operating temperature of the shock absorber.

A graphical representation of the relationship between the relative vertical translation speed of the shock absorber and the damping force of the shock absorber as a function of the operating temperature of the shock absorber is shown in FIG. 5.

The offset signal or data $\pm \Delta I_{amm}$ of the driving current intensity is provided by the evaluator module 54 at the input of the control module 12 so that it can consequently vary the intensity of the driving current of the control valve to reach a working point corresponding to a predetermined nominal damping force of the shock absorber.

The processing module 14 is arranged to execute a program or group of computer programs, for example stored locally, adapted to carry out the process (algorithm) for controlling the damping characteristic of a shock absorber of a vehicle, particularly for compensating the variation of the operating temperature of the shock absorber.

Advantageously, the entire process described above is repeated at regular time intervals or continuously, so as to periodically or continuously update the driving current of the shock absorbers to maintain the damping characteristic of the shock absorbers unaltered. In this way it is possible to adapt the behavior of the suspension system to the variation (as long as sustainable) of the temperature of the shock absorbers, i.e. the viscosity of the operating fluid, so as not to make an alteration of the absolute driving comfort, of the comfort settings desired by the driver and the dynamic performance of the vehicle perceivable to the passengers.

If the thermal effect on the shock absorbers is not fully recoverable, since it is objectively excessive with respect to the predetermined control dynamics, the system is designed to warn the driver of reaching a critical temperature (for example 100° C.), still within a safe limit for component reliability, signaling the opportunity to let the damper cool down to avoid damage to the suspension system.

Of course, the principle of the invention being understood, the manufacturing details and the embodiments may widely vary compared to what described and illustrated by way of a non-limiting example only, without departing from the scope of the present invention as defined in the appended claims.

The invention claimed is:

1. A method for controlling damping characteristics of a shock absorber of a vehicle for compensating variation of an operating temperature of the shock absorber, in an active or semi-active suspension system comprising:

a plurality of adjustable damping shock absorbers, each including a pressure chamber containing a damping fluid, inside which a piston is slidable whose position defines a lower pressure chamber and an upper pressure chamber, a by-pass chamber in communication with the upper pressure chamber, and a control valve, arranged to control passage of the damping fluid between the pressure chamber and the by-pass chamber, wherein each adjustable damping shock absorber of said plurality of adjustable damping shock absorbers is associated with a corresponding one of a plurality of vehicle wheels;

sensors that detect a relative vertical acceleration or a relative vertical movement between a body of the vehicle and each one of said plurality of vehicle wheels; and an electronic processing and control unit that receives signals indicative of said relative vertical acceleration or said relative vertical movement, and arranged to emit driving signals of the control valves of each of the adjustable damping shock absorbers to achieve predetermined damping characteristics of each of the adjustable damping shock absorbers, wherein, for each one of said plurality of vehicle wheels and associated adjustable damping shock absorber, the method includes the steps of:

estimating a mechanical power dissipated in heat by the adjustable damping shock absorber as a function of a relative vertical translation speed between the wheel with which the adjustable damping shock absorber is associated and the body of the vehicle and of a quantity representative of the driving signal of the control valve of the adjustable damping shock absorber in a current operating condition of the adjustable damping shock absorber, according to a first predetermined reference response model of the adjustable damping shock absorber indicative of a nominal relation between the relative vertical translation speed of the adjustable damping shock absorber, said quantity representing the driving signal of the control valve and a damping force of the adjustable damping shock absorber;

estimating a thermal power exchanged by the adjustable damping shock absorber with an environment according to at least one current operating condition of the vehicle;

evaluating a current operating temperature of the adjustable damping shock absorber as a function of said estimated mechanical power dissipated in heat and of said estimated thermal power exchanged with the environment; and controlling the driving signal of the control valve of each adjustable damping shock absorber according to a second predetermined shock absorber reference model indicating a relationship between the damping force of each adjustable damping shock absorber, the operating temperature of each adjustable damping shock absorber and said quantity representative of the driving signal of each control valve, varying the magnitude of the quantity representative of the driving signal of each control valve to reach a working point of said second predetermined shock absorber reference model corresponding to a predetermined nominal damping force of the adjustable damping shock absorber.

2. The method as set forth in claim 1, wherein the step of estimating the thermal power exchanged by the adjustable damping shock absorber with the environment as a function of at least one current operating condition of the vehicle includes estimating heat exchange of the adjustable damping shock absorber with the environment as a function of ambient temperature.

3. The method as set forth in claim 1, wherein the step of estimating the thermal power exchanged by the adjustable damping shock absorber with the environment as a function of at least one current operating condition of the vehicle includes estimating heat exchange of the adjustable damping shock absorber with the environment as a function of vehicle's travel speed.

4. The method as set forth in claim 1, wherein the step of estimating the thermal power exchanged by the adjustable damping shock absorber with the environment as a function of at least one current operating condition of the vehicle includes estimating the heat exchange of the adjustable damping shock absorber with the environment as a function of the use of a vehicle's braking system.

5. The method as set forth in claim 1, wherein the step of estimating the thermal power exchanged by the adjustable damping shock absorber with the environment as a function of at least one current operating condition of the vehicle includes estimating the heat exchange of the adjustable damping shock absorber with the environment as a function of an operating temperature of a vehicle propulsion unit.

6. The method as set forth in claim 1, wherein the operating temperature of the adjustable damping shock absorber is estimated as a function of a shock absorber's thermal capacity.

7. The method as set forth in claim 1, wherein said first predetermined reference response model and said second predetermined reference model are integrated into an overall reference model indicative of a plurality of nominal relationships between the relative vertical translation speed of each adjustable damping shock absorber, of said quantity representing the driving signal of each control valve and the damping force of each adjustable damping shock absorber for different operating temperatures of the damping fluid.

8. The method as set forth in claim 1, wherein said first predetermined reference response model is an analytical relationship between, or a map of numerical values in a bijective correspondence with, the relative vertical translation speed of each adjustable damping shock absorber, said quantity representative of the driving signal of each control valve and the damping force of each adjustable damping shock absorber determined at an operating temperature of the adjustable damping shock absorber comprised between −40° C. and 120° C.

9. The method as set forth in claim 1, wherein said quantity representative of the driving signal of each control valve of each adjustable damping shock absorber is a quantity representative of a driving current of said valve.

10. The method as set forth in claim 1, wherein the relative vertical translation speed between the wheel with which each adjustable damping shock absorber is associated and the body of the vehicle is determined by integration of signals indicative of the relative vertical acceleration.

11. The method as set forth in claim 10, wherein said sensors include at least three accelerometers coupled to the body of the vehicle and at least one accelerometer coupled to a wheel hub of the vehicle with which the adjustable damping shock absorber is associated.

12. The method according as set forth in claim 1, wherein the relative vertical translation speed between the wheel with which each adjustable damping shock absorber is associated and the body of the vehicle is determined by derivative of signals indicative of a stroke of each adjustable damping shock absorber associated with the wheel.

13. A control system of damping characteristic of a shock absorber of a vehicle for compensation of variation of an operating temperature of the shock absorber, in an active or semi-active suspension system comprising:

a plurality of adjustable damping shock absorbers, each including a pressure chamber containing a damping fluid, inside which a piston is slidable, whose position defines a lower pressure chamber and an upper pressure chamber, a by-pass chamber in communication with the upper pressure chamber, and a control valve, arranged to control passage of the damping fluid between the pressure chamber and the by-pass chamber;

sensors that detect a relative vertical acceleration or a relative vertical movement between a body of the vehicle and each one of said plurality of vehicle wheels; and an electronic processing and control unit that receives signals indicative of said vertical relative acceleration or said relative vertical movement, and arranged to emit driving signals for of the control valves of the adjustable damping shock absorbers to achieve predetermined damping characteristics of the adjustable damping shock absorbers;

said electronic processing and control unit including a processing module for estimating and compensating the variation of the operating temperature of the shock absorber, said processing module including:
a first estimator module;
a second estimator module;
an evaluator module; and
a controller module,
said processing module for estimating and compensating for the variation in operating temperature of the shock absorber being configured to:
estimate, by the first estimator module, a mechanical power dissipated in heat by each adjustable damping shock absorber as a function of a relative vertical translation speed between the wheel with which the adjustable damping shock absorber is associated and the body of the vehicle and of a quantity representative of the driving signal of each control valve of each adjustable damping shock absorber in a current operating condition of each adjustable damping shock absorber, according to a first predetermined reference response model of the adjustable damping shock absorber indicative of a nominal relation between the relative vertical translation speed of each adjustable damping shock absorber, said quantity representing the driving signal of each control valve and a damping force of each adjustable damping shock absorber;
estimate, by the second estimator module, a thermal power exchanged by each adjustable damping shock absorber with an environment according to at least one current operating condition of the vehicle;
evaluate, by the evaluator module, a current operating temperature of each adjustable damping shock absorber as a function of said estimated mechanical power dissipated in heat and of said estimated thermal power exchanged with the environment; and
control, by the controller module, the driving signal of each control valve of each adjustable damping shock absorber according to a second predetermined shock absorber reference model indicating a relationship between the damping force of each adjustable damping shock absorber, the operating temperature of each adjustable damping shock absorber and said quantity representative of the driving signal of each control valve, varying the magnitude of the quantity representative of the driving signal of each control valve to reach a working point of said second predetermined shock absorber reference model corresponding to a predetermined nominal damping force of each adjustable damping shock absorber.

14. An active or semi-active suspension system for a vehicle, comprising a control system of the dampening characteristic of each adjustable damping shock absorber of a vehicle for compensating variation of an operating temperature of the shock absorber as set forth in claim 13.

* * * * *